US008941266B2

(12) United States Patent
Boys

(10) Patent No.: US 8,941,266 B2
(45) Date of Patent: Jan. 27, 2015

(54) INDUCTIVE POWER TRANSFER SYSTEM PICK-UP CIRCUIT

(75) Inventor: John Talbot Boys, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 1241 days.

(21) Appl. No.: 12/227,815

(22) PCT Filed: May 30, 2007

(86) PCT No.: PCT/NZ2007/000131
§ 371 (c)(1),
(2), (4) Date: Jul. 6, 2009

(87) PCT Pub. No.: WO2007/139401
PCT Pub. Date: Dec. 6, 2007

(65) Prior Publication Data
US 2009/0302688 A1 Dec. 10, 2009

(30) Foreign Application Priority Data

May 30, 2006 (NZ) ........................................ 547604

(51) Int. Cl.
H01F 38/00 (2006.01)
H02M 1/42 (2007.01)
H02J 5/00 (2006.01)
H02M 3/335 (2006.01)

(52) U.S. Cl.
CPC ............ *H02M 1/4225* (2013.01); *H02J 5/005* (2013.01); *H02M 3/33561* (2013.01); *Y02B 70/126* (2013.01); *Y02B 70/1433* (2013.01)
USPC .......................................... 307/104; 320/108

(58) Field of Classification Search
CPC ........... H01F 38/14; H02J 17/00; H02J 5/005; H02J 7/025
USPC .......................................... 307/104; 320/108
See application file for complete search history.

(56) References Cited

U.S. PATENT DOCUMENTS 5,224,029 A * 6/1993 Newman, Jr. .................... 363/48
5,293,308 A 3/1994 Boys et al.
5,684,678 A 11/1997 Barrett (Continued)

FOREIGN PATENT DOCUMENTS

GB 2000398 A * 1/1979
JP 06237573 8/1994

(Continued)

OTHER PUBLICATIONS

Original and English translation of Notification of Reasons of Rejection from corresponding Japanese application mailed Nov. 6, 2012.

(Continued)

*Primary Examiner* — Jared Fureman
*Assistant Examiner* — Alfonso Perez Borroto
(74) *Attorney, Agent, or Firm* — Law office of Richard F. Jaworski, PC

(57) ABSTRACT

An IPT pick-up circuit includes a resonant circuit including a pick-up inductor and a tuning capacitance in parallel with the pick-up inductor, a control system to control power transfer to the pick-up circuit and a power conditioning impedance provided in series between the resonant circuit and the control system, selected to provide a required power factor in the resonant circuit.

9 Claims, 6 Drawing Sheets

(56) References Cited

U.S. PATENT DOCUMENTS

| | | | |
|---|---|---|---|
| 5,831,348 A * | 11/1998 | Nishizawa | 307/104 |
| 6,515,878 B1 * | 2/2003 | Meins et al. | 363/37 |
| 7,522,878 B2 * | 4/2009 | Baarman | 455/41.1 |
| 7,781,916 B2 * | 8/2010 | Boys | 307/104 |
| 2001/0021114 A1 * | 9/2001 | Terashi | 363/16 |
| 2003/0174522 A1 * | 9/2003 | Xu et al. | 363/22 |
| 2004/0218406 A1 * | 11/2004 | Jang et al. | 363/37 |
| 2007/0120421 A1 * | 5/2007 | Boys | 307/11 |

FOREIGN PATENT DOCUMENTS

| | | | |
|---|---|---|---|
| JP | 8308152 | | 11/1996 |
| JP | 2000116036 | | 4/2000 |
| JP | 2002291177 | | 10/2002 |
| JP | 2002291177 A | * | 10/2002 |
| WO | WO 2004105207 A1 | * | 12/2004 |
| WO | WO2004105208 | | 12/2004 |

OTHER PUBLICATIONS

Original and English translation of Notification of Reasons of Rejection from corresponding Japanese application mailed May 20, 2014.

* cited by examiner

INDUCTIVE POWER TRANSFER SYSTEM PICK-UP CIRCUIT

FIELD OF INVENTION

This invention relates to Inductively Coupled Power Transfer (ICPT, or IPT) systems. More particularly, the invention relates to an improved IPT pick-up circuit eliminating the need for a DC inductor.

BACKGROUND TO THE INVENTION

IPT systems are well known for a number of industrial applications, and have particular advantages where traditional methods are unable to perform satisfactorily, for example clean rooms, people moving, materials handling and battery charging.

The basic IPT system consists of three main components, being a power supply, a primary track or coil usually consisting of an elongate conductive path and one or more pick-ups to which energy from the primary conductive path is transferred in a contactless manner. The operation of an IPT system is described in U.S. Pat. No. 5,293,308 (Boys et al), the contents of which are incorporated herein by reference.

A typical IPT system is shown in FIG. 1, in which a power supply 1 drives an elongate "track" conductor 2 with inductance $L_T$ with a constant current $I_T$. The pick-up inductor $L_1$ has a voltage induced in it by a fraction of the flux from the track conductor that intercepts it. This induced voltage is resonated using pick-up compensation circuitry 3, and rectified using rectifier 4 before being input into a switched-mode controller circuit 5 that produces a DC output voltage at output terminals 6 to power external loads. In most applications the pick-up compensation is a parallel capacitor that tunes $L_1$ at the frequency of operation and the switch-mode controller operates by decoupling the pick-up in the manner described in U.S. Pat. No. 5,293,308. In these circumstances the switch-mode controller appears to be an up-converter and the input to the switch-mode controller is a DC inductor so that the rectifier acts as a simple choke input filter.

This parallel-tuned pick-up controller circuit, shown in more detail in FIG. 2, is widely used and robust. Capacitor $C_1$ is used to tune the pick-up inductor $L_1$ to the required frequency. The DC inductor is referenced $L_{DC}$, and a filter capacitor $C_{DC}$ is provided across the load R. The switch S may be operated over a wide range of switching frequencies as required to control the power flow from the track to the pick-up coil for the particular application.

In operation the power taken from the track is controlled by the switch S to match the power required by the load resistor R. If the required output power is high then S is "off" for a higher percentage of the time and if it is low then S is "on" for a higher percentage of the time. In this way the power transfer from the primary conductive path to the pick-up circuit is controlled to hold the output voltage essentially constant while the load may vary. In practice the output voltage is regulated to be in the range ±10% of the required value. For voltages 10% or more high the switch is fully on while for voltages 10% or more low the switch is fully off.

In the application of the circuit there are however a number of disadvantages:
1. Even if the circuit is perfectly tuned current flowing in the pick-up coil induces a voltage back into the track conductor which is not perfectly in phase with the current in the track conductor, so that the circuit places a reactive load on the track and thence on to the power supply.
2. DC current flow in the DC inductor takes harmonic currents from the pick-up circuit and these induced harmonic voltages in the track conductor may cause EMI/RFI, and also degrade the performance. In many cases these harmonics are caused by discontinuous current flow in the DC inductor and this event causes a significant loss in power. Thus a large DC inductor is needed to prevent discontinuous current flow.
3. The reactive power in the pick-up circuit places stress on components in the pick-up circuit.
4. The DC inductor is physically large, and is an expensive component.

OBJECT

It is an object of the present invention to provide an IPT pick-up circuit, system or method which overcomes or ameliorates at least one of the foregoing disadvantages.

Alternatively, it is an object of the invention to provide an IPT pick-up circuit, system or method that at least provides the public with a useful choice.

BRIEF SUMMARY OF INVENTION

Accordingly in a first aspect the invention consists in An IPT pick-up circuit having:
a resonant circuit comprising a pick-up inductor and a tuning capacitance in parallel with the pick-up inductor;
control means to control power transfer to the pick-up circuit, and;
a power conditioning impedance selected to provide a required power factor in the resonant circuit.

Preferably the required power factor is unity power factor.

Preferably the power conditioning impedance comprises an inductive element. In a preferred embodiment the inductive element is provided between the resonant circuit and a rectifier means.

Preferably the inductive element has an inductance selected to be substantially the same magnitude as the inductance of the pick-up inductor. The tuning capacitance may include more than one capacitive element connected to provide a current doubler.

In a preferred embodiment the power conditioning impedance includes an inductive element connected between a common terminal of two of the capacitive elements and the rectifier.

Preferably the power conditioning impedance includes a compensatory capacitive element connected between the tuning capacitance and an inductive element to compensate for the reactive loading of the rectifier means on the circuit. The compensatory capacitive element may be selected to have a capacitive reactance which cancels a leading power factor of the circuit.

In a further aspect the invention consists in an IPT pick-up circuit having:
a resonant circuit comprising a pick-up inductor and a tuning capacitance in parallel with the pick-up inductor;
rectifier means to rectify current from the resonant circuit to provide the current to a load; and
an inductive element provided between the resonant circuit and the rectifier means.

In a further aspect the invention consists in an IPT system having a primary conductive path and a pick-up including a pick-up circuit according to any one of the preceding claims.

In yet a further aspect the invention consists in a method of conditioning power induced in an IPT system pick-up, the method including the steps of providing a power conditioning impedance in the pick-up to provide power factor correction to the resonant circuit.

Preferably the method includes the step of providing the power conditioning impedance between a resonant circuit of the pick-up and a rectifier. The power conditioning impedance may comprise an inductive element.

Preferably the method includes the step of providing a compensatory capacitance between the resonant circuit of the pick-up and the inductance to compensate for the reactive loading of the rectifier means on the circuit.

The invention also broadly includes any novel feature or combination of features described herein.

Further aspects of the invention will become apparent from the following description.

BRIEF DRAWING DESCRIPTION

Embodiments of the invention will be described below by way of example with reference to the accompanying drawings in which.

DESCRIPTION OF ONE OR MORE PREFERRED EMBODIMENTS

Figure 1:
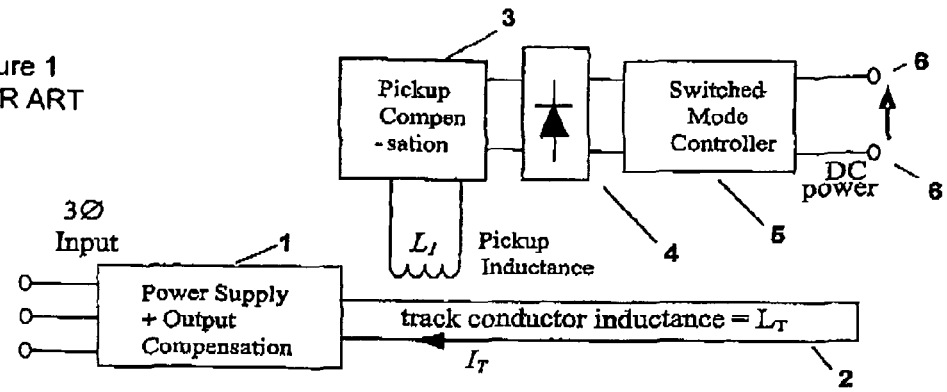
FIG. 1 is a diagrammatic illustration of a known IPT system.
Figure 2:
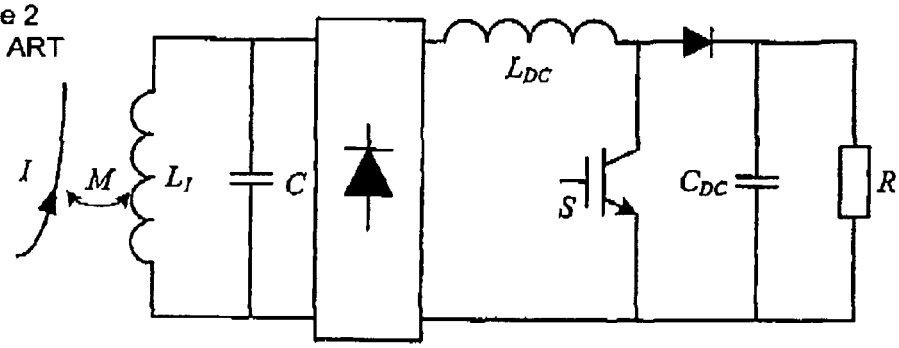
FIG. 2 is a circuit diagram of a known parallel tuned pick-up circuit.
Figure 3:
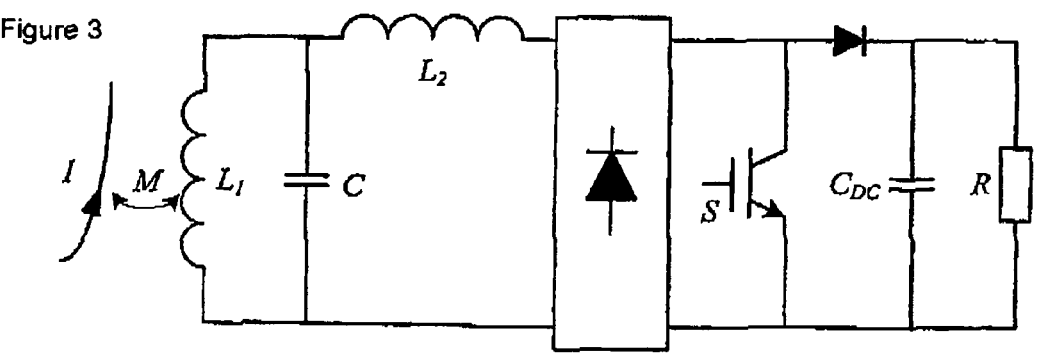
FIG. 3 is a circuit diagram for a new parallel tuned pick-up circuit according to the invention.

In the new circuit shown in FIG. 3 the pick-up compensation circuit of FIG. 1 includes a parallel capacitance as before but also uses a power conditioning impedance to provide a required power factor, and there is no DC inductor. As will be described below, the power conditioning impedance may be a single inductive component or a plurality of components. In FIG. 3 the power conditioning impedance comprises series inductor $L_2$, between the resonant circuit and the rectifier. The rest of the circuit is identical to that of FIG. 2. Inductor $L_2$ is chosen to have substantially the same (most preferably exactly the same) inductance as the inductance of the pick-up coil $L_1$ and the tuning capacitor C is chosen exactly as before to tune the pick-up inductance at the resonant frequency. The DC inductor $L_{DC}$ is not required, providing a significant saving in cost and space.

A comparison between the circuits may be made by comparing the load that the pick-up reflects back on to the track circuit. The ideal impedance reflected to the primary track for the circuit of FIG. 2 is given by $$Z_r = \frac{M^2}{L^2} \frac{\pi^2}{8} R - j\omega \frac{M^2}{L^2} \quad (1)$$

Here the first term is the desired term and corresponds to real power flow, while the second term is reactive power flow and acts to de-tune the track circuit. In this respect the detuning is constant and not affected by fluctuations in load (i.e. variations in R) but it is affected by variations in M, the mutual inductance between the track and the pick-up coil. In a system in which the pick-up is moved or is moveable with respect to the track these variations always occur as the pick-up meanders slightly from side to side as it moves along the track.

With the circuit of FIG. 3 the ideal reflected impedance is given by $$Z_r = \frac{M^2}{L_2^2} \frac{8}{\pi^2} R \quad (2)$$

The reflected impedance is now seen to be purely resistive—which is the same as far as real power is concerned, but the reactive component is completely eliminated. It can be seen that the equivalent resistor varies slightly between the two expressions because of the different actions of the rectifiers.

These expressions for $Z_r$ are exact if there is no rectifier and pure resistive loads but they lose accuracy in the presence of diode rectifiers. With the original circuit of FIG. 2 this loss in accuracy can be difficult to compensate for but with the new circuit compensation described herein it is possible.

Measured Performance

Figure 7:
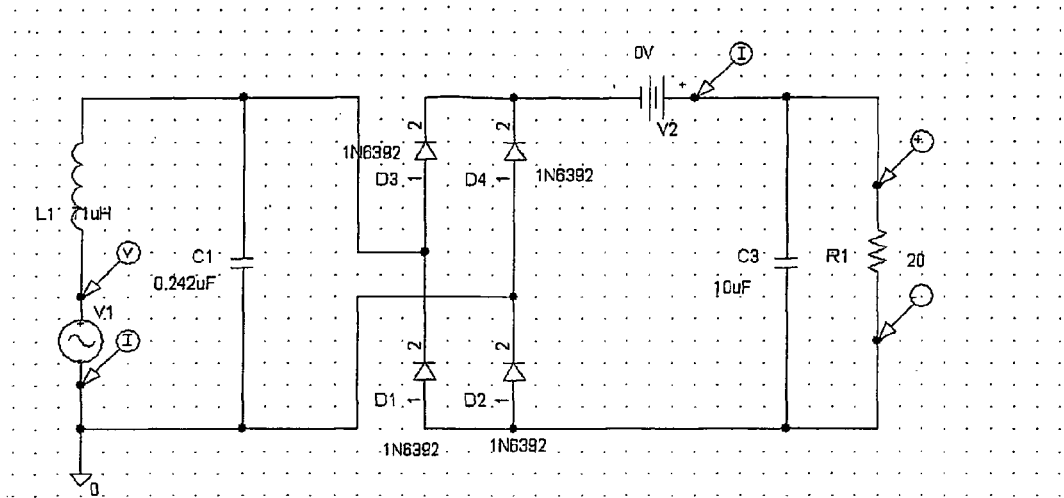
FIG. 7 is a circuit diagram for purposes of simulation of the pick-up circuit of FIG. 2 without the DC inductor.
Figure 8:
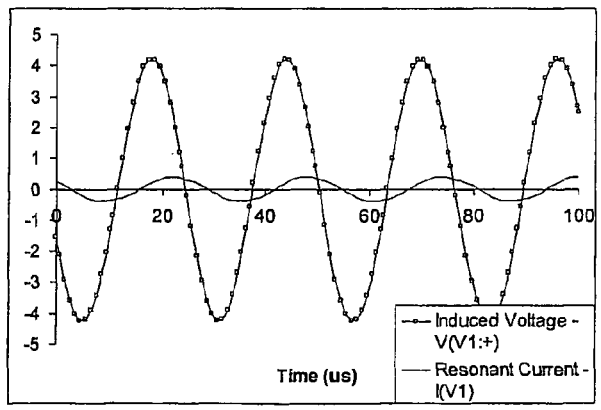
FIGS. 8 and 9 are plots of current and voltage against time in the resonant circuit and load, respectively, of the circuit of FIG. 7.
Figure 9:
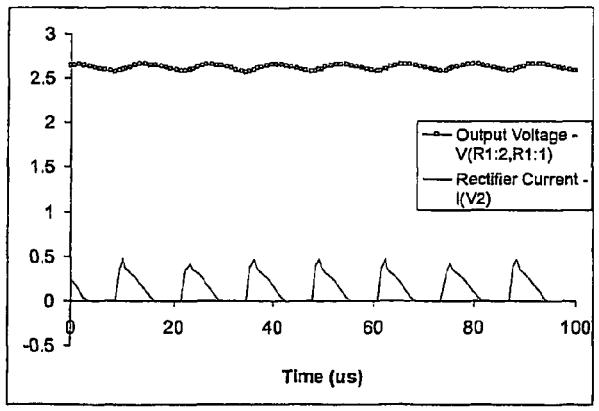
Figure 10:
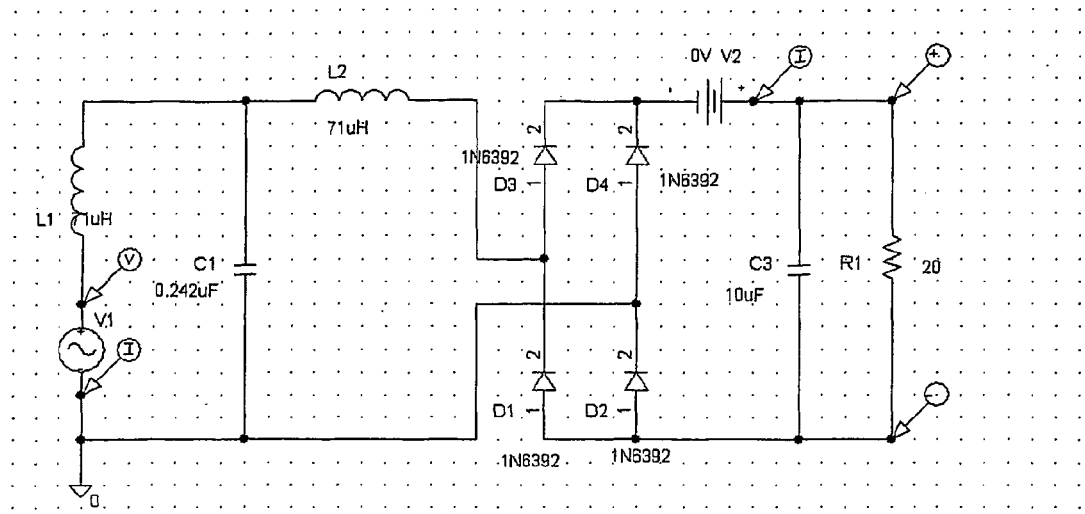
FIG. 10 is a circuit diagram for purposes of simulation of the pick-up circuit of FIG. 3.
Figure 11:
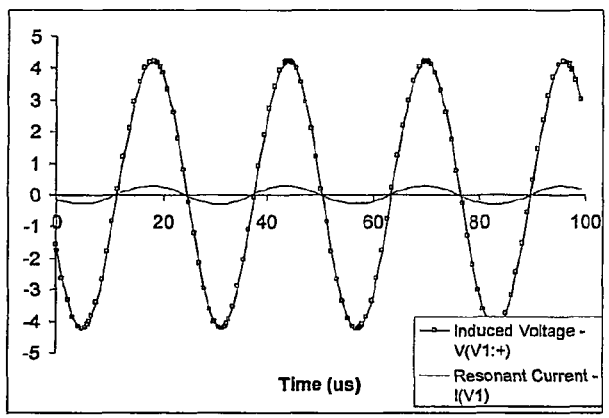
FIGS. 11 and 12 are plots of current and voltage against time in the resonant circuit and load, respectively, of the circuit of FIG. 10.
Figure 12:
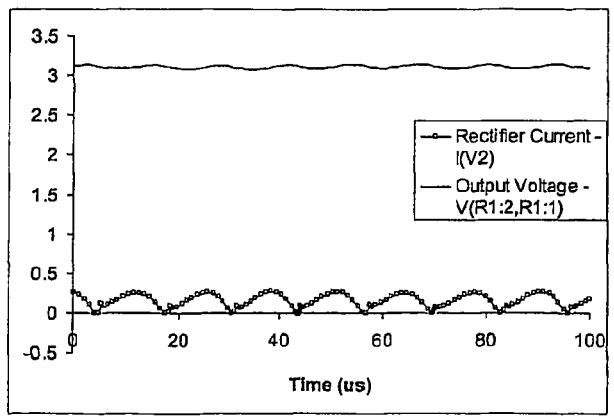
Figure 13:
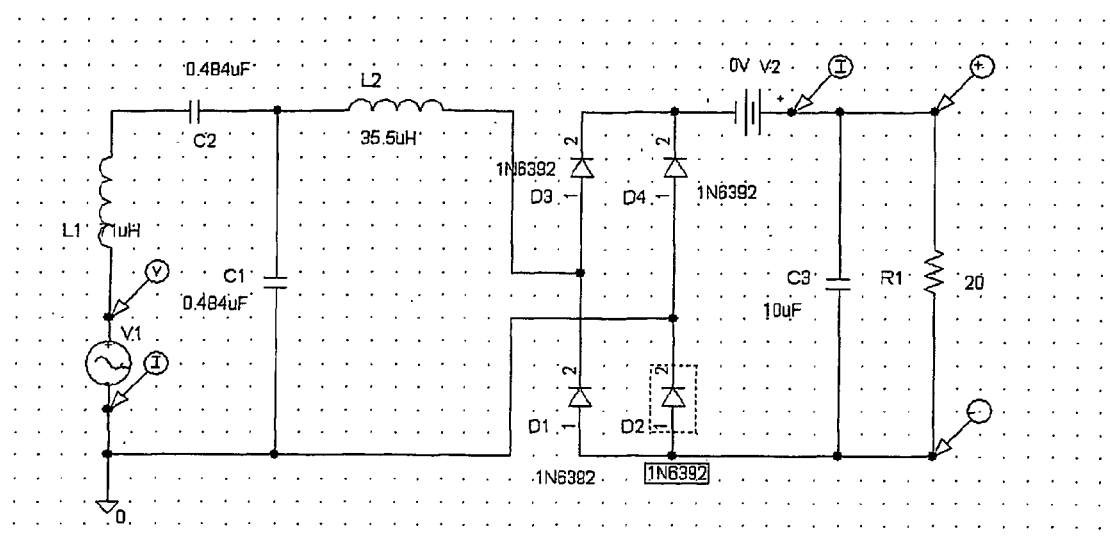
FIG. 13 is a circuit diagram for purposes of simulation of the pick-up circuit of FIG. 3 including a current multiplier.
Figure 14:
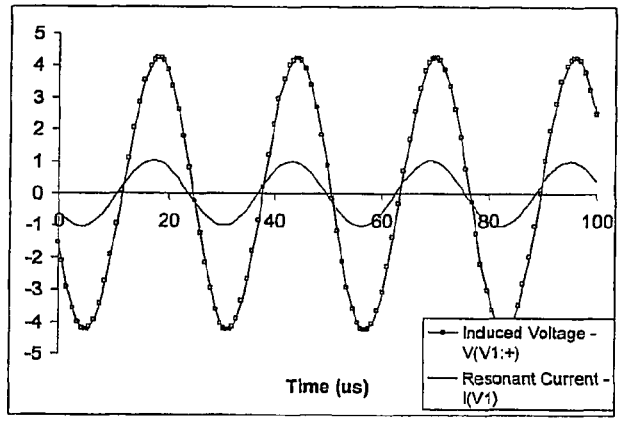
FIGS. 14 and 15 are plots of current and voltage against time in the resonant circuit and load, respectively, of the circuit of FIG. 13.
Figure 15:
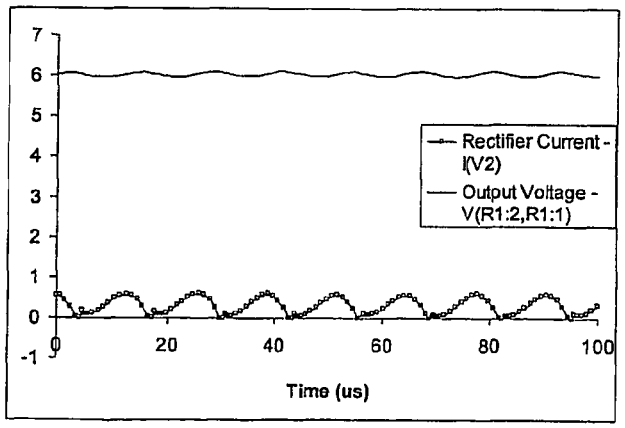

Measurements on the performance of the new pick-up topology which includes the power conditioning impedance compared with the old circuit of FIG. 2 will now be provided for four conditions. In each case the current and the induced voltage in the pick-up coil $L_1$ are shown as one graph, and the current and the voltage in the load are shown as the other graph. In practice the induced voltage cannot be observed while the pick-up is operating so here all results are shown as computer simulations. The circuits are all for nominally the same power except for the last circuit (FIG. 13) where a current doubler is used. The circuits are:

1. "Original" circuit (FIG. 4), with FIG. 5 sharing current and voltage in the pick-up coil, and FIG. 6 showing current and voltage in the load
2. "Original" circuit without a DC inductor (FIG. 7), with FIG. 8 showing the current and voltage in the pick-up coil, and FIG. 9 showing current and voltage in the load
3. New circuit (FIG. 10), with FIG. 11 showing the current and voltage in the pick-up coil, and FIG. 12 showing the current and voltage in the load
4. New circuit with a current doubler (FIG. 13), with FIG. 14 showing the current and voltage in the pick-up coil, and FIG. 15 showing the current and voltage in the load The circuits here are simulated tested under ideal conditions with no controller so that each circuit operates at the maximum power that it can sustain. All circuits operate at 38.4 kHz, with a load resistor R of 20 Ohms. The induced pick-up coil voltage in all cases is assumed to be 3.0V rms.

Figure 4:
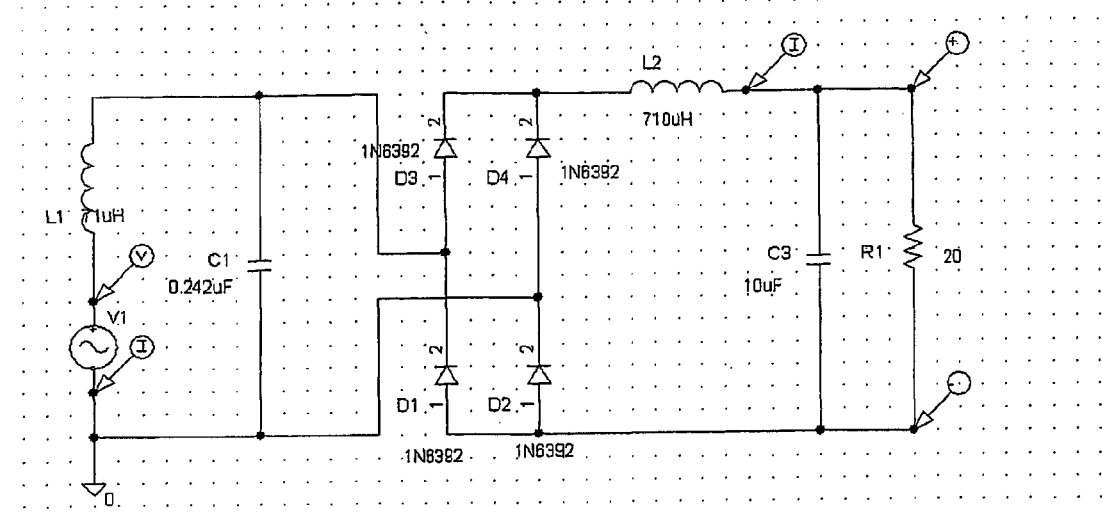
FIG. 4 is a circuit diagram for purposes of simulation of the pick-up circuit of FIG. 2.
Figure 5:
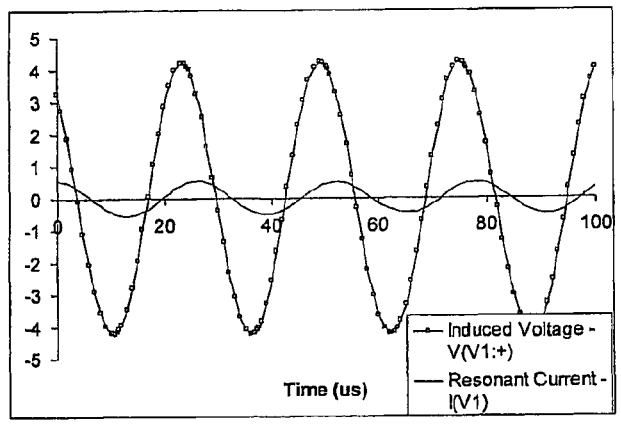
FIGS. 5 and 6 are plots of current and voltage against time in the resonant circuit and load, respectively, of the circuit of FIG. 4.
Figure 6:
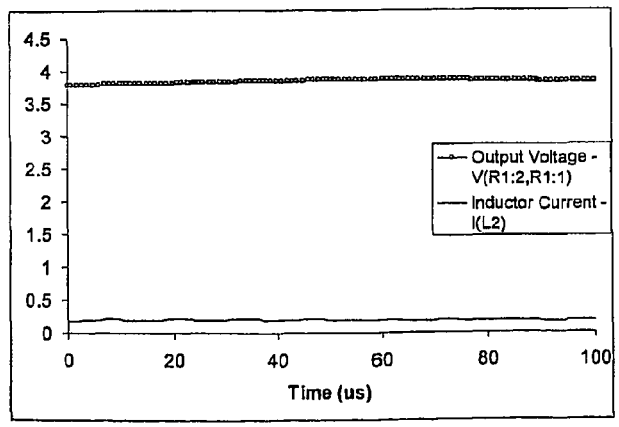

FIGS. 4 to 6 show that the original circuit has a significant lagging phase shift between the induced voltage and the inductor current. When the DC inductor $L_{DC}$ is removed (FIGS. 7 to 9) this phase shift is even more severe and the power reduces by 33%. This reduction is caused by the poor power factor with a discontinuous rectifier output current, which is also rich in harmonics.

Figure 17:
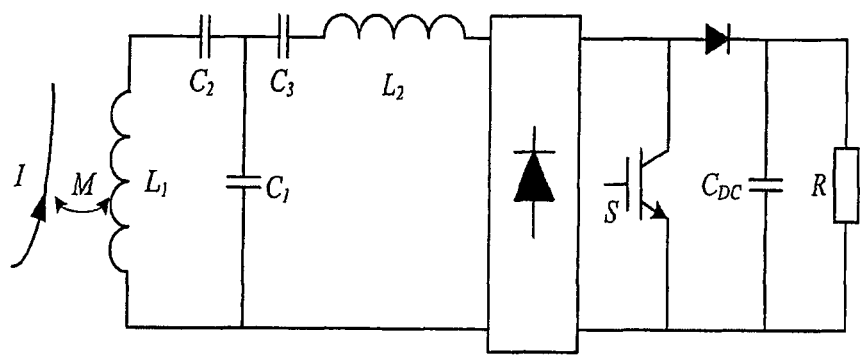
FIG. 17 is a circuit diagram for a unity power factor IPT pick-up system according to the invention.

The new circuit (FIGS. 10 to 12) shows an excellent power factor with induced voltage and current in the pick-up inductor being substantially in phase, and a load current which closely resembles a rectified sine wave. The output voltage is lower than that for the circuit of FIGS. 4 to 6 because of the different rectifier action with and without a DC inductor $L_{DC}$. The new circuit actually shows a slightly leading power factor caused by the reactive loading of the diode rectifier on the pick-up circuit. Those skilled in the art will appreciate that the inductor $L_2$ may be selected or adjusted to provide a desired power factor, and/or a further component may be used as part of the power conditioning impedance, for example a capacitor in series with $L_2$ may be used to compensate for the leading power factor. FIG. 17 shows a complete circuit with this compensatory capacitor $C_3$ included.

Figure 16:
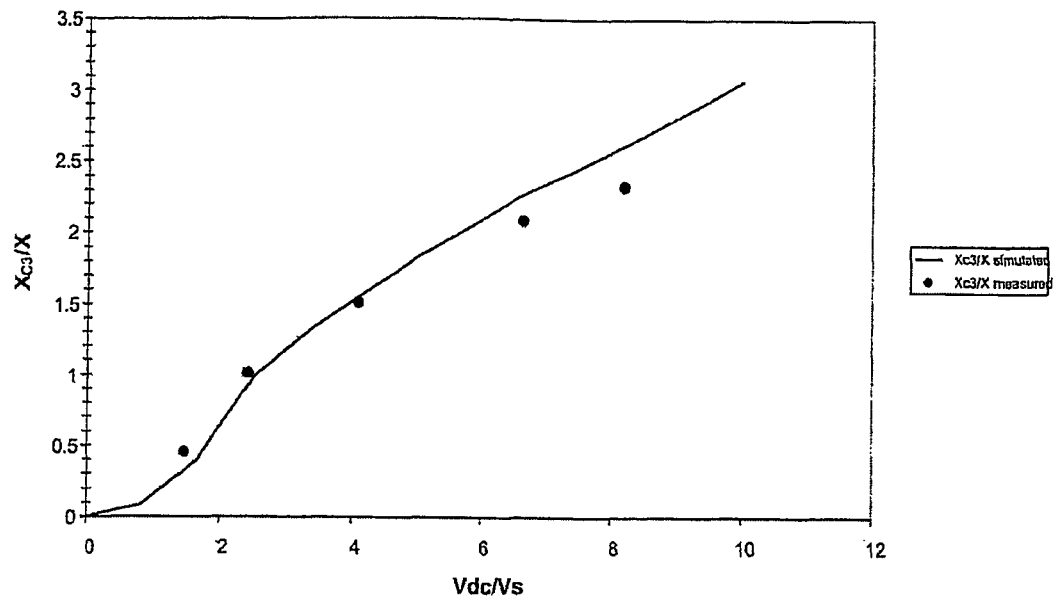
FIG. 16 is a plot of the capacitive reactance compensation required for unity power factor.

When the compensatory capacitor $C_3$ is used in series with $L_2$, the value of that capacitor must be chosen normalised to the reactance of the $L_1$-$C_1$-$L_2$ components—which as noted are all preferably the same reactance. The value for the reactance of $C_3$ as a function of the output DC voltage normalised to the induced voltage in the pick-up inductor $L_1$ is given in FIG. 16. This graph shows computer simulated values compared with experimental measurements. For example if the induced pick-up voltage is 3 V rms and the required output voltage is 6 V DC then the power factor ratio is 2.0. From FIG. 16 for a ratio of $2^0$ the correction required is 0.6 and the required reactance for the series capacitor is 0.6 times the reactance of the $L_1$-$C_1$-$L_2$ components. Thus the required reactance for $C_3$ is 0.6 times the reactance of $L_2$. This correction allows the power conditioning impedance to completely cancel the leading power factor referred to above.

With a current multiplier, such as a current doubler for the purposes of this example, the output current (refer to FIGS. 13 to 15) is exactly twice that of circuit 3 (FIGS. 10 to 12) so that the output voltage is doubled for the same load resistor R. This multiplying action can be obtained relatively easily by splitting the tuning capacitance C (by providing a plurality of capacitors in series, such as $C_1$ and $C_2$ in FIG. 17, in whatever ratio is required, and connecting the inductor $L_2$ between a common terminal of the tuning capacitors and the rectifier. The same multiplying action can be used with the circuit of FIG. 2 but with significant restrictions.

Comparing the power factors for circuit 1 and 3 the input voltage and current for circuit 1 are 3V at 360 mA and the output voltage (allowing 0.35 V per diode) is 4.6 volts at 0.195 A so the power factor of the circuit is 0.83. For circuit 3 the power output is 3.8 V at 0.155 A for an input of 3V at 200 mA giving a power factor of 0.98. This is a very significant improvement which shows clearly in the different input currents to the controllers. In this respect therefore the new circuit can be expected to be significantly more efficient than the original controller.

The new circuit is simple to make and offers more flexibility than the old circuit. It is more efficient and has a higher power factor. The new circuit uses a power conditioning impedance, such as an AC inductor $L_2$ of specific value whereas the old circuit used a 'large' DC inductor $L_{DC}$—the new inductor is smaller and lower cost. The ability to use current multipliers made of simple capacitors in the pick-up controller is also a significant advance. The new circuit also has the advantage that the reduction or elimination of reactive power reduces stresses on components. The circuit has the advantages of a series tuned pick-up with excellent power factor and tuning characteristics but where the voltages across components such as the resonant capacitor are reduced.

In a practical circuit the new technique also has a very significant advantage. In the circuit of FIG. 2 the diode rectifiers commutate with commutation currents sourced directly from $C_1$. In consequence the reverse recovery currents are essentially unrestricted and these large currents do cause significant Ratio Frequency Interference (RFI). In the new circuit however the reverse recovery currents are sourced through $L_2$, the commutating di/dt rates of current change are therefore much better controlled leading to lower current peaks and less RFI.

Where in the foregoing description reference has been made to specific components or integers of the invention having known equivalents, then such equivalents are herein incorporated as if individually set forth. Although this invention has been described by way of example and with reference to possible embodiments thereof, it is to be understood that modifications or improvements may be made thereto without departing from the scope of the invention.

The word "comprising" and variations such as "comprise" or "comprises" should be interpreted in this document in an inclusive sense unless the context clearly requires the contrary.

Any discussion of the prior art throughout the specification should in no way be considered as an admission that such prior art is widely known or forms part of common general knowledge in the field.

I claim:

1. An IPT pick-up circuit comprising:
a resonant circuit comprising a pick-up inductor and a tuning capacitance in parallel with the pick-up inductor;
a control system to control power transfer to the pick-up circuit, the control system comprising a rectifier system; and
a power conditioning impedance comprising an inductive element provided in series between the resonant circuit and the control system, the power conditioning impedance passing alternating current from the resonant circuit to the control system and the power conditioning impedance being selected to provide a required power factor in the resonant circuit, wherein the inductive element provided between the resonant circuit and the rectifier system and wherein the power conditioning impedance comprises a compensatory capacitive element connected between the tuning capactitance and an inductive element to compensate for reactive loading of the rectifier system on the circuit.

2. An IPT pickup circuit as claimed in claim 1 wherein the required power factor is unity power factor.

3. An IPT pickup circuit as claimed in claim 1, wherein the inductive element has an inductance selected to be a same magnitude as an inductance of the pick-up inductor.

4. An IPT pickup circuit as claimed in claim 1, wherein the tuning capacitance comprises more than one capacitive element connected to provide a current doubler.

5. An IPT pickup circuit as claimed in claim 4, wherein the power conditioning impedance comprises an inductive element connected between a common terminal of two of the capacitive elements and the control system.

6. An IPT pickup circuit as claimed in claim 1, wherein the compensatory capacitive element is selected to have a capacitive reactance which cancels a leading power factor of the circuit.

7. An IPT pickup circuit as claimed in claim 1, wherein the rectifier system supplies current to a filter capacitor which is in parallel with a load.

8. A method of conditioning power induced in an IPT system pick-up, the method comprising:
   providing a power conditioning impedance in series between a resonant circuit of the pick-up and a rectifier of the pick-up; and
   receiving power inductively by the pick-up whereby the power conditioning impedance provides alternating current from the resonant circuit to the rectifier and power factor correction to the resonant circuit to thereby condition the power induced in the pick-up, wherein the step of providing a power conditioning impedance comprises providing an inductive element in series between the resonant circuit and the rectifier and further comprising providing a compensatory capacitance between the resonant circuit of the pick-up and the inductive element to compensate for the reactive loading of the rectifier on the circuit.

9. An IPT system having a primary conductive path and a pick-up including a pick-up circuit according to claim 1.

* * * * *